United States Patent [19]

McCoy

[11] 4,228,664
[45] Oct. 21, 1980

[54] FLEXIBLE DRIVE COUPLING

[75] Inventor: Christopher B. McCoy, Alpena, Mich.

[73] Assignee: Douville-Johnston Corporation, Alpena, Mich.

[21] Appl. No.: 959,089

[22] Filed: Nov. 8, 1978

[51] Int. Cl.³ .................................................. F16D 3/64
[52] U.S. Cl. ........................................................ 64/14
[58] Field of Search .................. 64/14, 27 NM, 27 L, 64/9 R, 16, 28 R

[56] References Cited

U.S. PATENT DOCUMENTS

| | | | |
|---|---|---|---|
| 2,363,469 | 11/1944 | Goldschmidt | 64/27 R |
| 2,716,334 | 8/1955 | Scott et al. | 64/14 |
| 2,847,836 | 8/1958 | Morris | 64/28 R |
| 2,891,395 | 6/1959 | Chater | 64/14 |
| 2,973,633 | 3/1961 | Hall | 64/14 |
| 3,096,106 | 7/1963 | Wanner | 64/27 NM |
| 3,884,049 | 5/1975 | Pauli | 64/14 |
| 4,043,146 | 8/1977 | Stegherr et al. | 64/9 R |

FOREIGN PATENT DOCUMENTS 592912 10/1947 United Kingdom .

Primary Examiner—Charles J. Myhre
Assistant Examiner—Magdalen Moy
Attorney, Agent, or Firm—Harness, Dickey & Pierce

[57] ABSTRACT

A flexible drive coupling comprised of a pair of identical coupling members and a flexible coupling insert disposed between the two coupling members for transmitting torque from the coupling member connected to the shaft of the prime mover to the coupling member connected to the shaft of the load. Each of the coupling members has a generally epitrochoidal-shaped insert disposed within a similarly shaped bore in the coupling member. The insert in turn has a shaft bore formed therein and a break in one wall thereof so that when torque is applied thereto, the insert readily conforms to the size of the shaft to thereby clamp the coupling member to the shaft.

12 Claims, 4 Drawing Figures

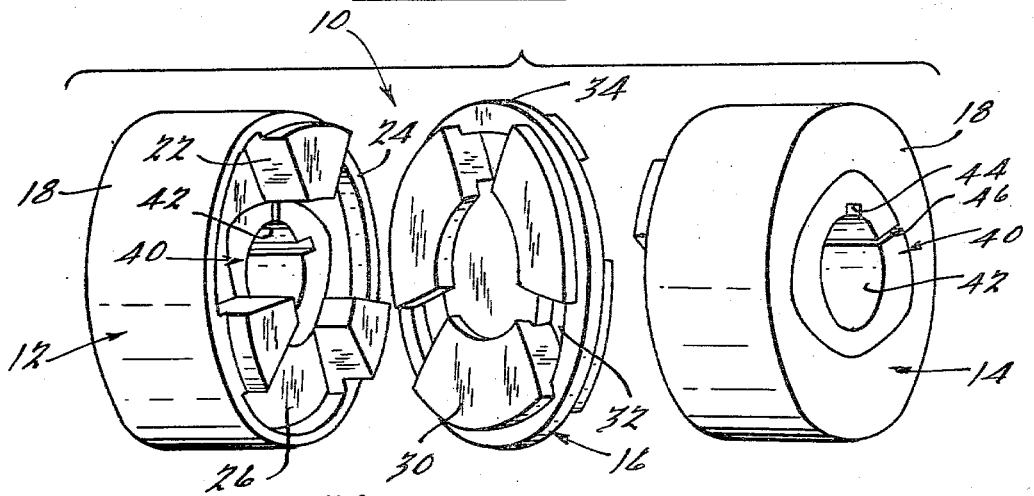
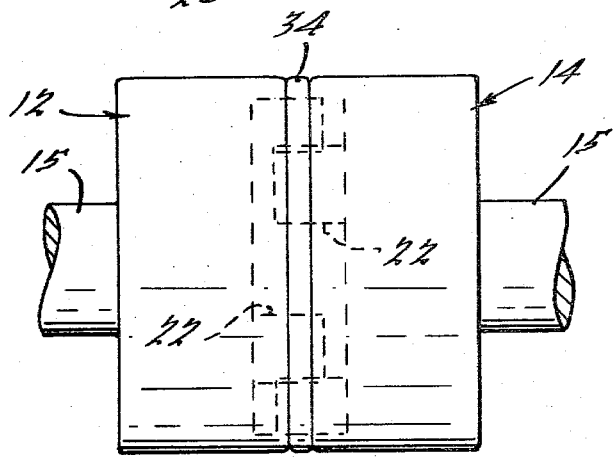
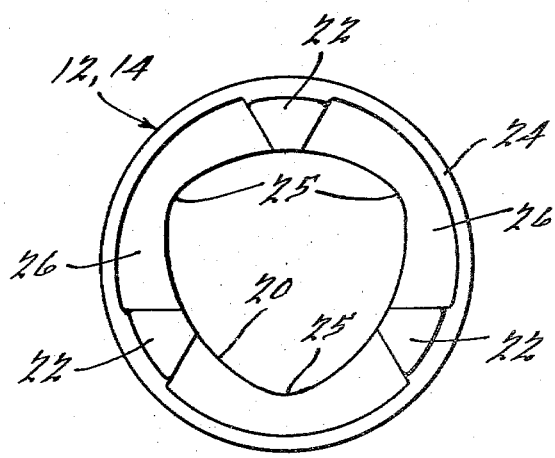
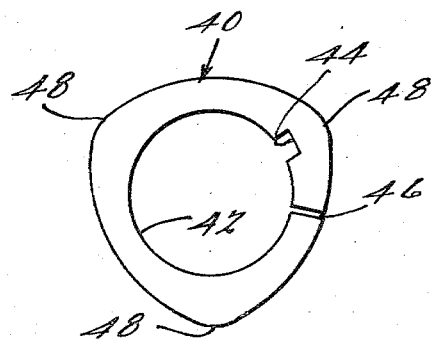

FLEXIBLE DRIVE COUPLING

BACKGROUND AND SUMMARY OF THE INVENTION

The present invention relates to a flexible drive coupling and in particular to a drive coupling having improved means for securing the coupling to a shaft.

Flexible drive couplings of the present type are typically used to connect the driving shaft of a prime mover, such as a motor or engine, to the driven shaft of a load such as a pump or other machine. The drive coupling is installed by securing one coupling member to the shaft of the prime mover and the other coupling member to the shaft of the load, and then aligning the two shafts so that the two coupling members mate with one another. Drive couplings of the present type typically include a flexible coupling insert that is located intermediate the two main coupling members and serves to transmit the torque from the coupling member fastened to the prime mover to the coupling member fastened to the load. The coupling insert also serves to accept the strain caused by any misalignment of the two shafts, thus avoiding excessive strain on the bearings of the prime mover and load.

Presently, there are two principal known methods of securing a coupling member to a shaft. The first method involves the use of a simple set screw that is typically located over the keyway insert in the central bore of the coupling, and is adapted to be securely tightened against the key insert when the coupling is properly positioned at the end of the shaft. The set screw can also be utilized with splined shaft couplings as well. The other principal type of securing means utilized is the clamp-type coupling. The clamp-type coupling has a narrow gap in one section of the coupling member that is bridged by a set screw threadedly engaged in a hole formed through the coupling member perpendicular to the gap. The coupling member is thus secured to the shaft by tightening the set screw to thereby close the gap and clamp the coupling member to the shaft.

These conventional fastening means do not, however, work well with certain types of flexible shaft couplings, and in particular, with those made of non-metallic material such as plastic. Specifically, when a set screw is utilized, the plastic female threads in the coupling are easily stripped, especially after repeated installations. Moreover, the formation of the transverse hole required in the clamp-type coupling tends to significantly reduce the integrity of the coupling member around the area of the hole. Consequently, the stress limits of the coupling member are severely restricted.

Accordingly, it is the primary purpose of the present invention to provide an improved means of fastening a flexible drive coupling to a shaft in a manner which will not reduce the integrity of the coupling. Although the present invention has particular application to non-metalic drive couplings, the concepts of the present invention are equally applicable to standard metal couplings as well. In general, the coupling members of a flexible drive coupling according to the present invention have a central bore form therein that is substantially epitrochoidal in shape. An insert having a corresponding shape is fitted within the bore of each coupling member. The insert has a shaft bore formed therein and a gap in one side thereof generally intermediate the apexes of the insert. Due to the shape of the insert, the coupling member is automatically secured to a shaft upon the application of torque to the insert. In particular, as the insert attempts to rotate within the outer coupling member, the gap in the insert is closed thereby adapting the bore in the insert to the size of the shaft. Moreover, it will be appreciated that the coupling member will remain secured to the shaft while the shaft is rotating due to the continuous application of torque to the insert from the shaft or the outer coupling member, depending upon whether the coupling member is fastened to the driving or driven shaft, respectively.

Thus, it can be seen that a novel flexible drive coupling is provided that is exceptionally easy to install. Moreover, it will be appreciated that, due to the presence of the removable insert, a single coupling can accommodate various sized shafts simply by changing the insert. In addition, the flexible drive coupling according to the present invention provides several manufacturing advantages over prior art type couplings. In particular, with the known clamp-type coupling discussed above, the shaft bore must be manufactured to extremely close tolerances in order to provide a coupling member that can initially be "push-fitted" onto the shaft and subsequently clamped tightly to the shaft by the relative small reduction in diameter of the central bore as the gap is closed by the tightening of the transverse set screw. With the present structure, however, the epitrochoidal insert is a relatively thin-walled structure which more readily adapts to the size of the shaft. Therefore, the tolerance of the shaft bore in the insert is not as critical. Accordingly, the present flexible drive coupling provides the advantages of a clamp-type coupling in that positive retention and centering of the coupling on the shaft is assured, without the associated manufacturing disadvantages of the clamp-type coupling.

Additional objects and advantages of the present invention will become apparent from a reading of the detailed description of the preferred embodiment which makes reference to the following set of drawings in which:

BRIEF DESCRIPTION OF THE DRAWINGS

FIG. 1 is an exploded view of a flexible drive coupling according to the present invention showing the individual coupling members and the flexible coupling insert;

FIG. 2 is an illustration of the flexible drive coupling of FIG. 1 in its installed form;

FIG. 3 is an end view of one of the coupling members shown in FIG. 1; and

FIG. 4 is an end view of the epitrochoidal-shaped insert of the present invention.

DETAILED DESCRIPTION OF THE PREFERRED EMBODIMENT

Referring to FIG. 1, a disassembled flexible drive coupling 10 according to the present invention is shown. The flexible drive coupling 10 comprises a pair of coupling members 12 and 14 and a flexible coupling insert 16. The coupling members 12 and 14 which are identical to one another comprise a cylindrically-shaped body 18 having formed therein a substantially epitrochoidal-shaped central bore 20. (FIG. 3). The inner face of each coupling member 12 and 14 has projecting therefrom three sector-shaped driving lugs 22 symmetrically arranged about its axis. As will readily be appreciated by those skilled in the art, the coupling members 12 and 14 may have a greater or lesser number of driving lugs. A flange 24 located around the periphery of the inner face of each coupling member 12 and 14, together with the driving lugs 22, define three substantially sector-shaped sockets 26 whose arcuate length is substantially greater than that of the drive lugs 22.

As is best shown in FIG. 3, the epitrochoidal-shaped bore 20 is preferably formed in the coupling member 12 so that the apexes 25 of the bore 20 are located intermediate the driving lugs 22. In this manner, the portions of reduced thickness in the walls of the coupling member 12 at the apexes 25 of the bore 20 are spaced away from the drive lugs 22 where the stress imposed upon the coupling member is concentrated. Accordingly, the integrity of the coupling member 12 is in no way affected by the modified shape of the bore 20.

Since it is desirable to have the drive lugs 22 of one coupling member 12 overlap as much as possible the drive lugs 22 of the other coupling member 14 when the drive coupling is fully assembled (FIG. 2), the drive lugs 22 of both coupling members 12 and 14 protrude beyond the flange 14 so that they will extend into the sockets 26 of the complimentary coupling member when the unit is assembled. In addition, it will be noted that the drive lugs 22 are offset radially inwardly from the peripheral flange 24 to prevent the drive lugs 22 of one coupling member 12 from contacting the flange 24 of the other coupling member 14.

It is to be understood at this point that, although the coupled shafts 15 in FIG. 2 are shown in perfect axial alignment, the present flexible drive coupling 10 is intended to compensate for those situations in which misalignment may occur without causing excessive strain on the bearings of the prime mover and load. Moreover, the present invention is designed so that in the event of misalignment the flexible coupling insert 16 will accept the strain. Thus, the worse that can occur is that the flexible insert 16 which is easily and inexpensively replaced, will be damaged.

The flexible coupling insert 16 which is disposed between the two coupling members 12 and 14 serves to transmit the torque from the driving coupling member to the driven coupling member. The coupling insert 16 is preferably composed of an elastomeric material such as neoprene or natural rubber. Basically, the coupling insert 16 is shaped so as to fill all of the voids between the two inner faces of the coupling members 12 and 14 when the drive coupling 10 is assembled. Specifically, the coupling insert 16 has three sector-shaped segments 30 on each face thereof which are adapted to fit into the sockets 26 between the drive lugs 22 of both coupling members 12 and 14. In addition, opposite each of the sector-shaped portions 30 is a blind socket 32 which receives the drive lugs 22 of the coupling members 12 and 14.

It will also be noted that the web 34 of the coupling insert 16 extends radially outwardly beyond the sector-shaped portions 30 so as to fit between the opposed edges of the flanges 24 of the coupling members 12 and 14, as best shown in FIG. 2. The web 34 of the coupling insert is of sufficient thickness so that the combined axial length of the flanges 24 of both coupling members 12 and 14 and the web 34 is greater than the axial length of a drive lug 22.

Thus, it will be appreciated that when the drive coupling 10 is fully assembled, as shown in FIG. 2, no part of coupling member 12 contacts coupling member 14. This can be important when the coupling members 12 and 14 are made of metal as is conventional and complete electrical isolation between the two shafts is required. However, when the coupling members 12 and 14 are constructed of non-conductive high strength plastic as in the preferred embodiment, the presence of the web 34 in the coupling insert 16 becomes less significant and can accordingly be eliminated. In addition, it will also be appreciated that the flexible coupling insert 16 is completely confined by the two coupling members 12 and 14, to prevent the mass of the coupling insert 16 from flowing out of position when subjected to pressure.

Referring now to FIG. 4, the epitrochoidal-shaped insert 40 that is fitted within the bore 20 of both coupling members 12 and 14 is shown. The axial length of the insert 40 in the preferred embodiment is approximately equal to the axial length of the coupling member between its inner and outer faces. The insert 40 has formed therein a bore 42 having a diameter slightly larger than the diameter of the shaft to which the coupling member is intended to be connected. Although the insert 40 shown is for a smooth shaft, it will be appreciated that the shaft bore 42 can be readily modified to fit a splined shaft as well. A keyway 44 is also formed in the bore 42 to secure the insert 40 against axial rotation relative to the shaft. The keyway 44 is preferably formed adjacent one of the apexes 48 of the insert 40 where the wall thickness of the insert 40 is the greatest. A narrow gap 46 is cut through the wall of the insert 40 along its entire axial length at a point intermediate the apexes 48 of the insert 40 where the thickness of the insert is smallest.

Although not specifically shown in the drawing, it is also preferable that means be provided for preventing axial movement of the insert 40 relative to the coupling member 12 or 14. Such means may for example take the form of a groove and ridge arrangement around the outer surface of the insert 40 and the inner surface of the bore 20, respectively so that the insert is snap-fitted into the bore of the coupling member 12 or 14. Additional methods may also be employed.

Due to the shape of the insert 40, it will be appreciated that the coupling member is automatically secured against axial movement relative to the shaft once torque is applied to the insert 40. Specifically, the insert 40 will upon the application of torque attempt to rotate relative to the coupling member 12 or 14, which in turn will cause the insert 40 to deform slightly closing the gap 46 and thereby clamping the insert, and hence the coupling member, to the shaft. As noted previously, since the insert 40 is a relatively thin-walled structure, the insert 40 will readily adapt to the size of the shaft. Thus, it will be appreciated that once the drive coupling 10 has fitted on the shafts 15, as shown in FIG. 2, both coupling members 12 and 14 will automatically become clamped to their respective shafts upon actuation of the prime mover. Alternatively, each coupling member 12 or 14 can be individually secured to its respective shaft 15 simply by manually applying a torque to the coupling member. To unclamp the coupling members 12 and 14 from their shafts 15 simply requires the application of torque in the reverse direction. This also can be readily provided manually.

Although the concepts of the present invention are not intended to be limited to a particular material composition, the design of the present flexible drive coupling 10 does lend itself to a plastic coupling. In the preferred embodiment herein, the coupling members 12 and 14 are composed of a lightweight mineral reinforced nylon. The use of an inexpensive, high-strength plastic material of this type would not be practically feasible with a conventionally designed coupling. This is due to the tolerance problems associated with molding such high-strength plastic material. However, with the present coupling design, it will be appreciated that the dimensions of the epitrochoidal shaped bore 20 in the coupling members 12 and 14 are not as critical as the dimension of the shaft bore in the insert 40. Consequently, an inexpensive high-strength plastic material can be utilized for the outer coupling members 12 and 14, while the insert 40, which does not require a high-strength material, can therefore be made from inexpensive plastic material which can easily be molded to the critical dimensions required. Thus, as will be appreciated by those skilled in the art, the preferred embodiment of the present flexible drive coupling is not only lightweight, durable, and easily installed, but is also inexpensive to manufacture.

While the above description constitutes the preferred embodiment of the invention, it will be appreciated that the invention is susceptible to modification, variation and change without departing from the proper scope or fair meaning of the accompanying claims.

What is claimed is:

1. In a drive coupling for transmitting rotational energy from a driving shaft to a driven shaft including a pair of coupling members each having a plurality of drive lugs and a coupling element disposed intermediate said coupling members for transmitting rotational energy from the coupling member disposed on said driving shaft to the coupling member disposed on said driven shaft; an improved means of securing a coupling member to a shaft comprising a substantially epitrochoidal-shaped insert disposed within a similarly shaped bore formed in said coupling member, said insert having a shaft bore formed therein including means for preventing rotation of said insert relative to said shaft, and a narrow gap formed in one wall of said insert for permitting said insert to conform to the size of said shaft upon the application of torque from the driving shaft to said insert, thereby preventing axial movement of said coupling member relative to said shaft.

2. The drive coupling of claim 1 wherein said gap is located generally intermediate adjacent apexes of said insert.

3. The drive coupling of claim 1 wherein said coupling member has three drive lugs symmetrically arranged about the axis of said coupling member, and the epitrochoidal shaped bore of said coupling member is formed so that the apexes thereof are located intermediate said drive lugs.

4. The drive coupling of claim 1 wherein said coupling member is composed of a high strength plastic material.

5. The drive coupling of claim 4 wherein said insert is composed of a plastic material.

6. The drive coupling of claim 4 wherein said high strength plastic material comprises mineral reinforced nylon.

7. In a drive coupling for transmitting rotational energy from a driving shaft to a driven shaft including a pair of coupling members disposed on said shafts; an improved means of securing a coupling member to a shaft comprising an insert disposed within a bore in said coupling member and having a shaft bore formed therein, including means for preventing rotation of said insert relative to said shaft, and a gap formed in one wall thereof, said insert being characterized by a non-circular cross-sectional configuration that precludes rotation of said insert relative to said coupling member and causes the shaft bore in said insert to automatically conform to the size of said shaft by closing said gap upon the application of torque from the driving shaft to said insert.

8. The drive coupling of claim 7 wherein said insert is generally epitrochoidal in shape.

9. The drive coupling of claim 8 wherein the configuration of the bore in said coupling member is substantially the same as the configuration of said insert.

10. The drive coupling of claim 9 wherein said coupling member has a plurality of drive lugs symmetrically arranged about the axis of said coupling member and located intermediate the apexes of the bore formed therein.

11. The drive coupling of claim 7 wherein said coupling member is composed of a high strength plastic material.

12. The drive coupling of claim 11 wherein said high strength plastic material comprises mineral reinforced nylon.

* * * * *